United States Patent

[11] 3,543,896

| [72] | Inventor | George Meyer Mooney<br>St. Paul, Minnesota |
| [21] | Appl. No. | 790,594 |
| [22] | Filed | Jan. 13, 1969 |
| [45] | Patented | Dec. 1, 1970 |
| [73] | Assignee | Capitol Gears, Inc.<br>St. Paul, Minnesota<br>a corporation of Minnesota |

[54] POSITIVE DOG CLUTCH
12 Claims, 12 Drawing Figs.

[52] U.S. Cl. .................................................. 192/46,
192/21, 192/67, 192/108
[51] Int. Cl. ...................................................... F16d 11/00
[50] Field of Search ........................................... 192/20, 21,
46, 67, 108; 74/378, 462

[56] References Cited
UNITED STATES PATENTS

| 344,611 | 6/1886 | Applegate .................... | 192/108(UX) |
| 2,061,220 | 11/1936 | Cotterman .................... | 192/46 |
| 2,289,288 | 7/1942 | Kauffman ..................... | 74/378 |
| 3,245,280 | 4/1966 | Mooney ....................... | 74/462 |

*Primary Examiner*—Allan D. Herrmann
*Attorney*—Burd, Braddock & Bartz

ABSTRACT: An integral composite gear and clutch assembly having a one-piece gear with clutch teeth. A dog having cooperating teeth drives the gear. The engaging faces of the teeth on the gear and dog have cooperating convex spherical surfaces to centrally locate stress on the teeth.

Patented Dec. 1, 1970

INVENTOR.
GEORGE M. MOONEY
BY
Burd, MacEachron, Braddock,
Bartz & Schwartz
ATTORNEYS Patented Dec. 1, 1970
3,543,896
Sheet 2 of 3
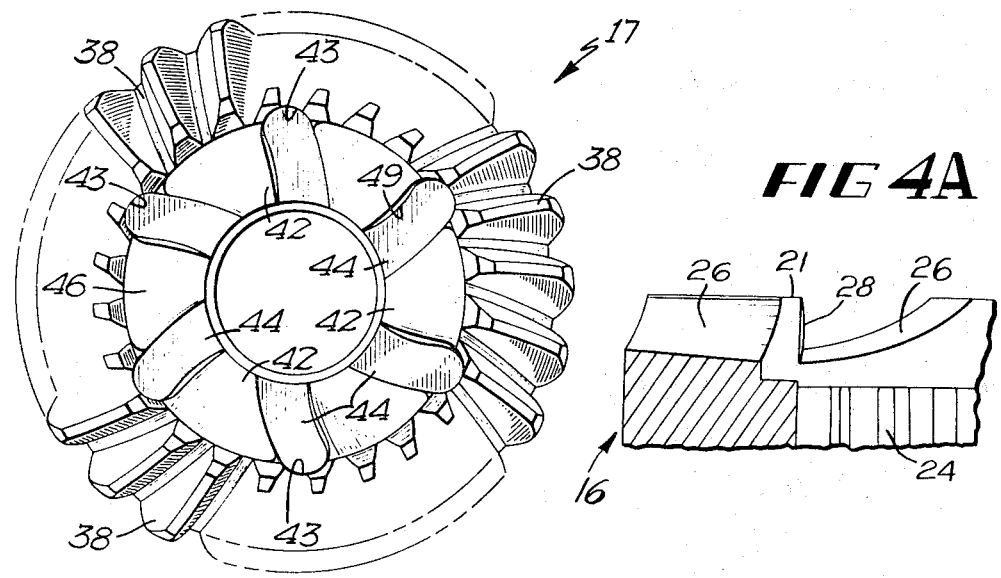
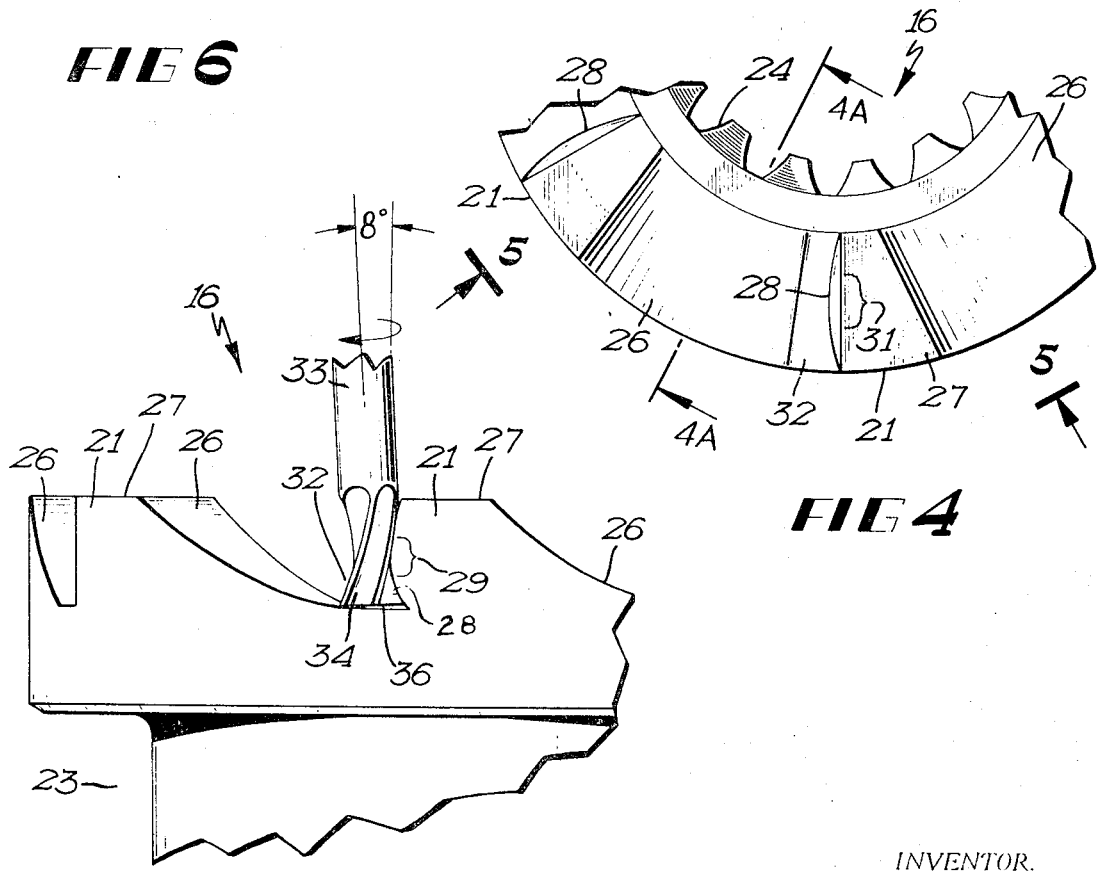
INVENTOR.
GEORGE M. MOONEY
BY
Burd, MacEachron, Braddock,
Bartz & Schwartz
ATTORNEYS

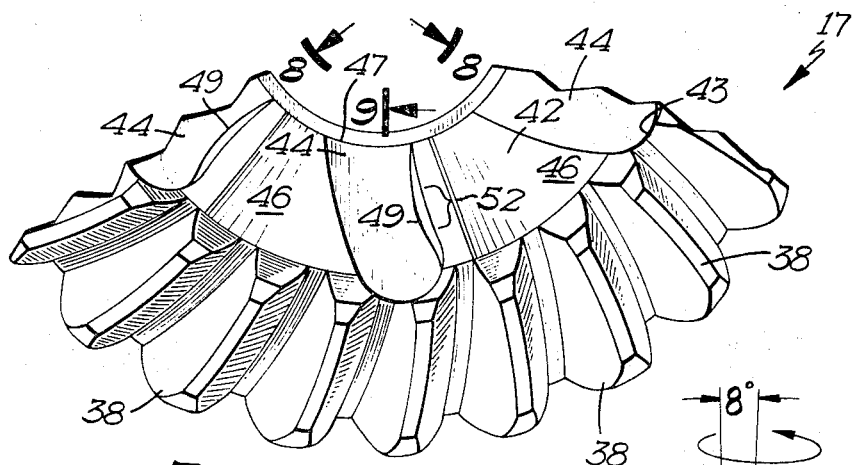
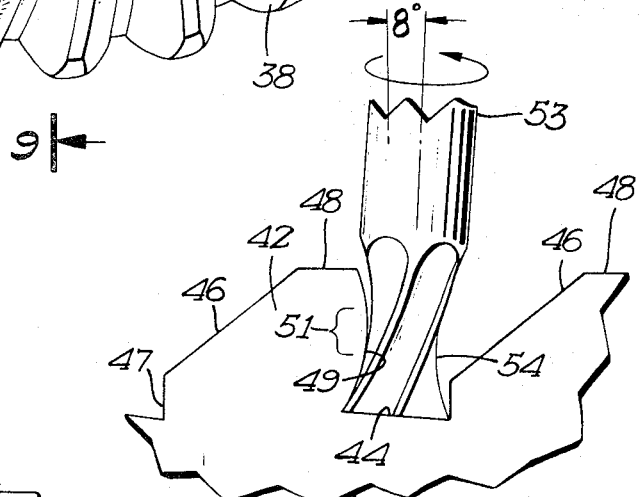
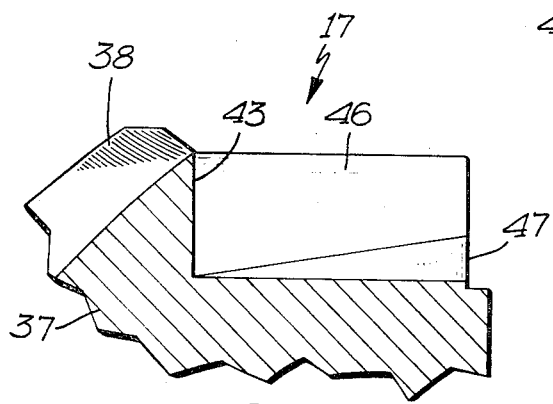
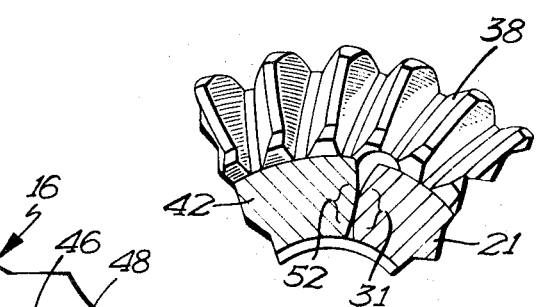
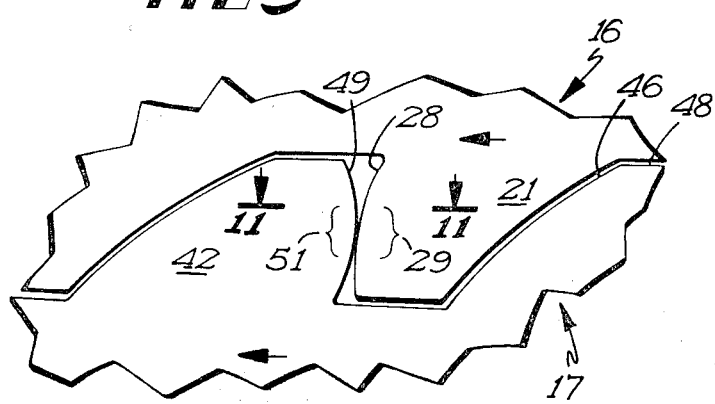

3,543,896

POSITIVE DOG CLUTCH

BACKGROUND OF INVENTION

Releasable dog clutches used in reversing gear drive mechanisms, as shown in U.S. Pat. No. 2,289,288, have engaging teeth surfaces that are inclined and flat. An improvement of this type of dog clutch was made by applicant in his U.S. Pat. No. 3,245,280 by fabricating the gear and clutch from a one piece member so that the gear teeth and clutch teeth are integral. The teeth of the gear clutch member are provided with convex radial crowns to concentrate the load of the force exerted on the teeth along a line in the mid sections of the teeth. When 100 or more horsepower is transmitted through this dog clutch, the teeth break and chip when they are not properly in engagement with each other. The outer corners of the engaging teeth are susceptible to breakage under these heavy loads. The engaging dog clutch of the present invention concentrates the load in the center areas of the engaging teeth so that a maximum stress distribution is achieved thereby minimizing breakage and chipping of the teeth under heavy loads.

SUMMARY OF INVENTION

The present invention relates to a dog clutch for transmitting power in one direction of rotation. The clutch has a driven member with a plurality of circumferentially spaced teeth. Each tooth has a driving face and a rearwardly sloping backside. The driven member cooperates with the driving member having a plurality of circumferentially spaced teeth axially alined with the teeth on the driven member. Each tooth of the driven member has a convex spherical face with a central crown engageable with the driving face of the cooperating tooth on the driven member. On engagement of the drive member with the driven member the central crown engages the central portion of the coacting tooth on the drive member so that forces are equally distributed on each side of the coacting teeth.

IN THE DRAWINGS

FIG. 4 is an enlarged fragmentary plan view showing the teeth of the drive member;

FIG. 4A is a sectional view taken along the line 4A-4A of FIG. 4;

FIG. 5 is an elevational view taken along the line 5-5 of FIG. 4;

FIG. 6 is an end elevational view of the driven member taken along the line 6-6 of FIG. 2;

FIG. 7 is an enlarged fragmentary plan view showing the integral gear and ratchet teeth of the driven member;

FIG. 8 is an elevational view taken along the line 8-8 of FIG. 7;

FIG. 9 is a sectional view taken along the line 9-9 of FIG. 7;

FIG. 10 is a fragmentary elevational view showing the engagement of coacting teeth of the drive and driven members; and FIG. 11 is a sectional view taken along the line 11-11 of FIG. 10.

Figure 1:
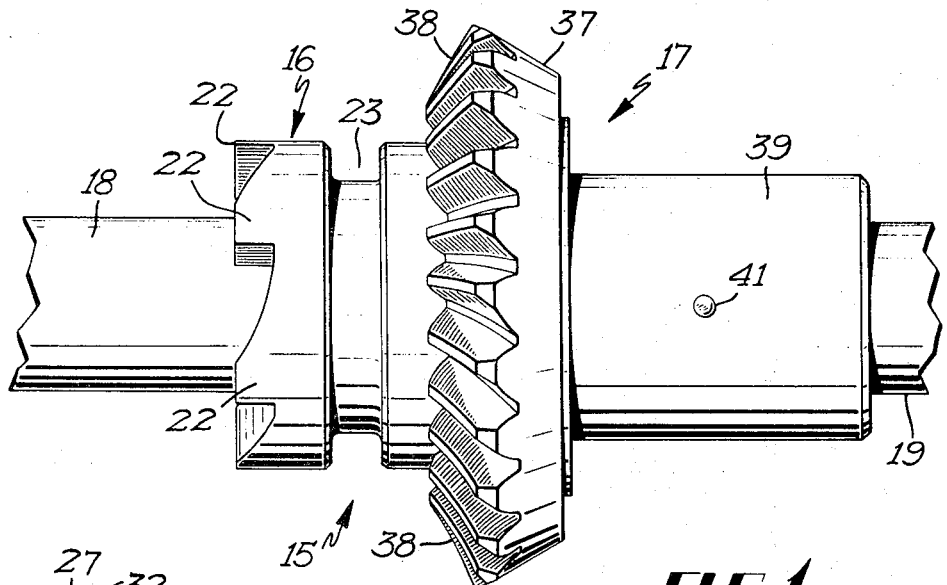
FIG. 1 is a side elevational view of the dog clutch of the invention showing the clutch in the engaged position.
Figure 2:
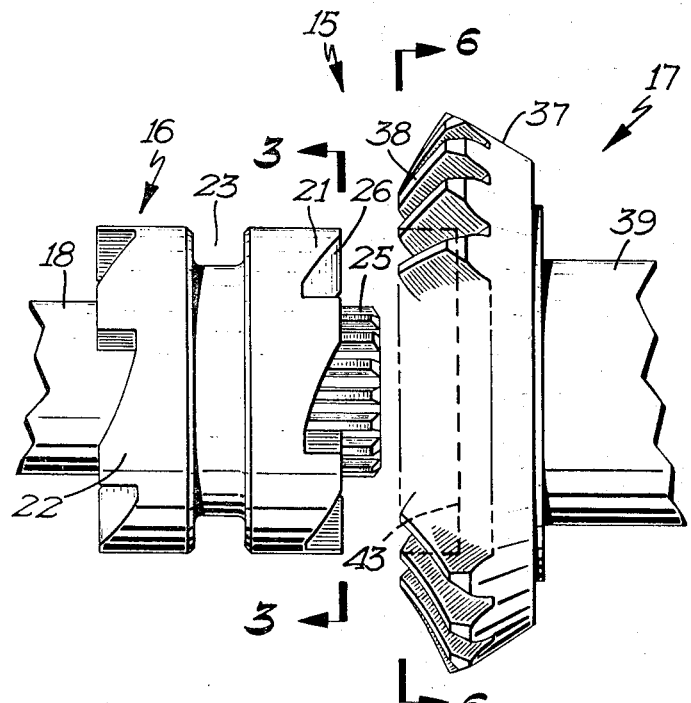
FIG. 2 is a view similar to FIG. 1 showing the dog clutch in the disengaged position.

Referring to the drawings there is shown in FIG. 1 the dog clutch of the invention indicated generally at 15 in driving engagement to transmit power from shaft 18 to shaft 19. The dog clutch 15 comprises a drive member 16 mounted on shaft 18 in axial alinement with a driven member 17 mounted on shaft 19. Power transmitted to shaft 18 is transmitted to driven member 17 by the interlocking engagement of the drive member 16 with the driven member 17. As shown in FIG. 2, the drive member 16 is in the disengaged position spaced from the driven member 17. The linkage structure for moving the drive member into engaged and disengaged positions is not illustrated and does not form part of the invention.

Figure 3:
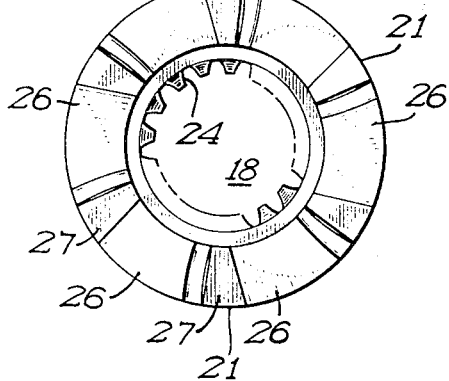
FIG. 3 is an end elevational view of the drive member taken along the line 3-3 of FIG. 2.

As shown in FIG. 2 and 3, drive member 16 has circumferentially spaced ratchet teeth 21 and 22 at the opposite ends of a cylindrical body having a central groove 23. The internal bore of the body has splines 24 and is mounted in axial sliding engagement on splines 25 on the end of the drive shaft 18.

The teeth 21 and 22 on the drive The 16 are identical in shape. the following description is limited to a single tooth shown in detail in FIG. 4 and 5. Tooth 21 has an upwardly and arcuately inclined back 26 joined to a flat top 27. Back 26 as shown in FIG. 4A, is also inclined downwardly in the radial inward direction whereby the outer peripheral portion of the tooth is larger than the inner portion. Back 26 is complementary to the shape and inclination of back 46 of tooth 42. The forward side of the tooth 21 has a curved engaging or drive face 28 having a centrally located vertical crown 29 spaced approximately midway between the base of the tooth and the outer end of the tooth. The vertical radius of the tooth is greater than the height of the tooth. As shown in FIG. 4, the tooth 21 has a radial crown 31 located approximately midway between the inner and outer ends of the tooth. The radius of the radial crown is greater than the radial length of the tooth. The circumferential length of the outer portion of the tooth is greater than the internal circumferential length of the tooth. Preferably, the outer circumferential length is approximately three times the length of the inner circumferential length of the tooth. The greater amount of metal at the outer portion of the tooth reinforces the outer peripheral portion of the tooth. The crowns 29 and 31 are superimposed on each other and lie along a line passing through the axis of rotation of member 16.

Immediately forward of the engaging face 28, a radial groove or valley 32 spaces the face 28 from the backside 26 of the adjacent tooth. The groove 32 is initially made by a rotary cutter (not shown) which forms the backside of the tooth and the initial face 28. A rotatable milling tool 33 having concave side cutter members 34 which form the vertical arcuate shape providing the vertical crown 29. The tool 33 is at an angle of about 3° to 8° with respect to the longitudinal axis of rotation of the member 16 so that face 28 is forwardly inclined in the vertical direction. The lower end of the tool 33 forms the base 36 of the groove 32. The tool is rotated and simultaneously moved in an arcuate radial direction to concurrently form the radial crown 31 and the vertical crown 29 whereby the central area of the engaging face 28 is the foremost spherical configuration.

Returning to FIG. 1 and 2, the driven member 17 has an external bevel gear 37 with outwardly facing generally radial and spiral teeth 38. The gear has an axial hub 39 mounted on the shaft 19. A fastener 41, as a pin, drivably connects the hub to the shaft. The gear 37 is integral with the hub and has an axial recess 43 on the side opposite the hub. As shown in FIG. 6, a plurality of arcuate circumferentially spaced ratchet teeth 42 form the base of the recess 43. Generally radial grooves of or valleys 44 separate adjacent teeth.

Teeth 42 are identical in shape. The following description is limited to a single tooth. As shown in FIGS. 7, 8 and 9, tooth 42 has a upwardly sloping arcuate backside 46 which is inclined downwardly in an outward direction so that the inner peripheral side of the tooth has a shoulder 47. This shape of the tooth generally equalizes the amount of material from the inside of the tooth to the outside of the tooth so that the tooth has generally uniform strength throughout its radial length. The back side 46 terminates in a flat top 48 leading to the generally upright spherical-shaped engaging face 49. As shown in FIG. 8, the face 49 is generally convex shaped with a vertical crown 51 located generally between the base and outer end of the tooth so that the leading portion of the tooth is along the midsection of the tooth. As shown in FIG. 7, the engaging face 49 has a convex radial curvature forming a radial crown 52. The crown 52 is located substantially midway between the inner and outer edges of the tooth. As shown in FIG. 8 a milling tool 53 having concave side cutter members 54 is used to form the convex-engaging face 49. The milling tool 53 is rotated about its axis and concurrently moved in an arcuate direction to simultaneously form both the vertical and radial crowns. Tool 53 is at an angle of about 3° to 8° with respect to the axis of rotation of member 17 so that face 49 is forwardly inclined in the vertical direction. The crowns 51 and 52 are superimposed on each other and lie along a line passing through the axis of rotation of member 17.

As shown in FIGS. 10 and 11, on engagement of the drive member 16 with the driven member 17 the central portions of the teeth 21 and 42 are in engagement whereby maximum stress distribution on both teeth are achieved. The convex-engaging faces of the teeth minimize the breakage and chipping of the teeth as the corners of the teeth are not initially engaged. The teeth initially engage at their center crown portions in both vertical and radial directions. This especially important in the breaking in the mating pair of clutching teeth as there are always machine tolerances which result in slight misalignment of the teeth. After a period of use the engaging surfaces of the teeth conform to each other with a minimum of stress concentration at any particular point.

While the invention has been described and illustrated as a specific combined bevel gear and dog clutch it will be apparent that the principles are applicable to other types of dog clutches as well as positive brakes. The invention is not limited to any particular size, shape or number of clutch teeth or arrangement of the gear teeth. It is apparent that many modifications and variations of the invention may be made by those skilled in the art without departing from the spirit and scope of the invention. The invention is defined in the following claims.

I claim:

1. A dog clutch comprising: a drive member having a plurality of circumferentially spaced teeth positioned about the axis of rotation of drive member, each tooth having a back and an engaging drive face, said engaging drive face being convex curved in a generally radial direction and convex curved in a generally vertical direction whereby said drive face has a convex spherical crown located in the center area of the face, a driven member having a plurality of circumferentially spaced teeth positioned about the axis of rotation of the driven member and axially alined with the teeth of the drive member, each tooth of the driven member having a back and an engaging driven face being convex curved in a generally radial direction and convex curved in a generally vertical direction whereby said driven face has a central convex spherical crown engageable with a drive face of a tooth on the drive member whereby on engagement of the drive member with the driven member the central convex crowns of the coacting teeth engage each other.

2. The dog clutch of claim 1 wherein the back of each tooth of the driven member is circumferentially inclined downwardly in the radial outward direction.

3. The dog clutch of claim 2 wherein the back of each tooth of the drive member is circumferentially inclined and inclined downwardly in the radial inward direction.

4. The dog clutch of claim 3 wherein the engaging faces of the teeth on both the drive member and driven member are inclined inwardly in the forward direction by up to about 8°.

5. The dog clutch of claim 1 wherein the driven faces of the teeth on the driven member are inclined inwardly in the forward direction by up to about 8°.

6. The dog clutch of claim 1 wherein the engaging drive faces of the teeth on the drive member are inclined inwardly in the forward direction by up to about 8°.

7. A one-piece integral composite gear and clutch comprising: an unobstructed annular ring of a plurality of gear teeth disposed about an axis of rotation of the clutch and an annular ring of a plurality of arcuate-shaped sloping clutch ratchet teeth concentric with and within the inner periphery of said ring of gear teeth, said ratchet teeth being recessed relative to said gear teeth, each of said ratchet teeth having a back and an engaging face, said face being convex curved in a generally radial direction and convex curved in a generally vertical direction providing a convex spherical crown located in the central area of the face, said back being circumferentially inclined and inclined downwardly in the radial outward direction.

8. The composite gear and clutch of claim 7 wherein the engaging face of each tooth is inclined inwardly up to about 8°.

9. The composite gear and clutch of claim 7 wherein the gear teeth are spiral bevel gear teeth.

10. The composite gear and clutch of claim 7 wherein each of the crowns on the teeth are located generally along a line passing through the axis of rotation of the composite gear and clutch.

11. A clutch member comprising: an annular body having an annular ring of a plurality of arcuate-shaped sloping ratchet teeth, each of said ratchet teeth having a back and an engaging face, said engaging face being convex-curved in a radial direction and convex-curved in a generally vertical direction, whereby said engaging face has a convex spherical crown located generally in the central area of the face, said back being circumferentially inclined and inclined downwardly in a radial outward direction.

12. The clutch member of claim 11 wherein the engaging face of each tooth is inclined inwardly up to about 8°.